Oct. 9, 1956
F. D. PLANT
2,766,028
ROTARY BORING HEAD WITH MATERIAL ADVANCING MEANS
Filed Oct. 12, 1953
2 Sheets-Sheet 1
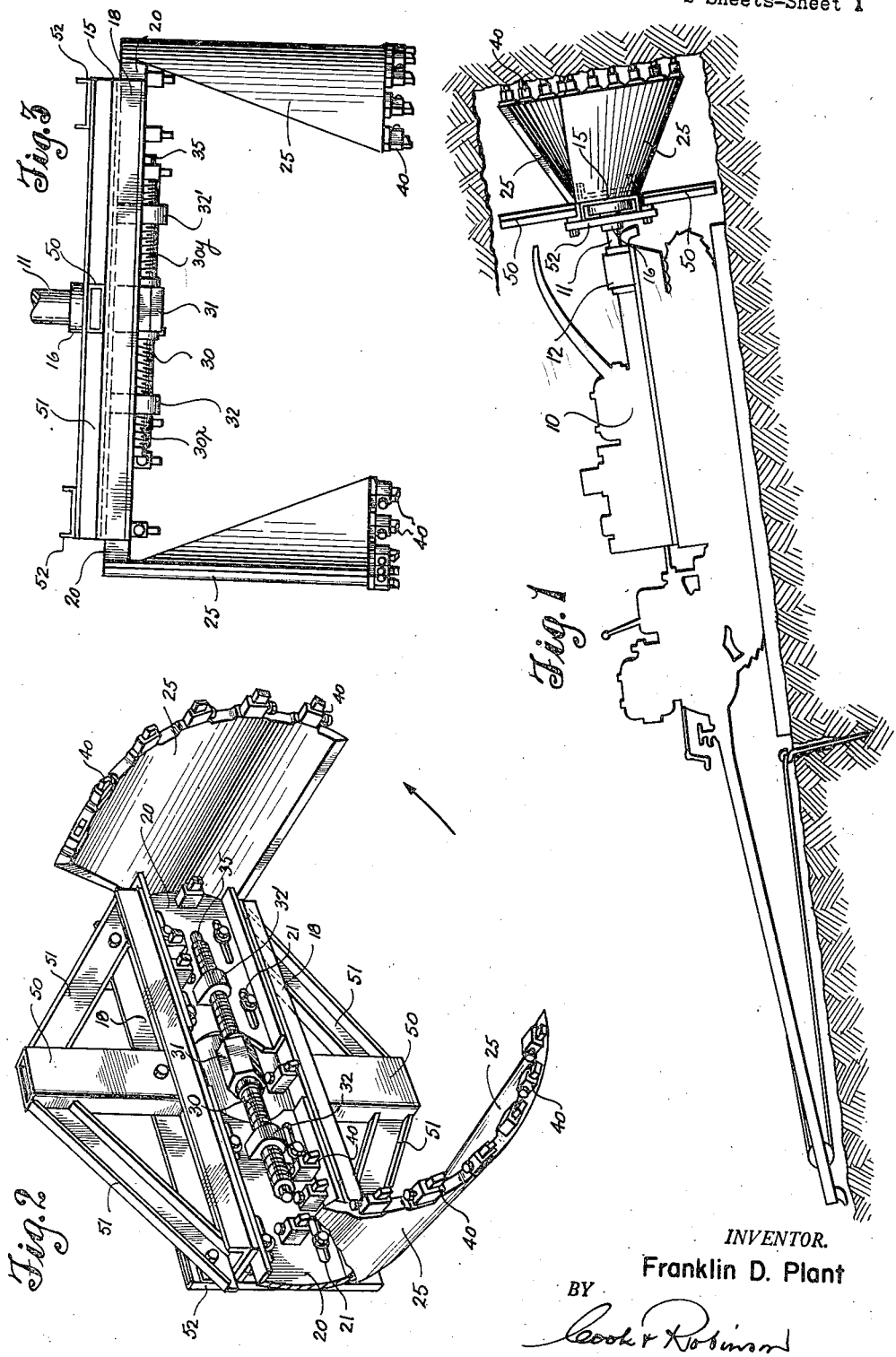
INVENTOR.
Franklin D. Plant
BY
Cook & Robinson
ATTORNEYS Oct. 9, 1956 F. D. PLANT 2,766,028
ROTARY BORING HEAD WITH MATERIAL ADVANCING MEANS
Filed Oct. 12, 1953 2 Sheets-Sheet 2
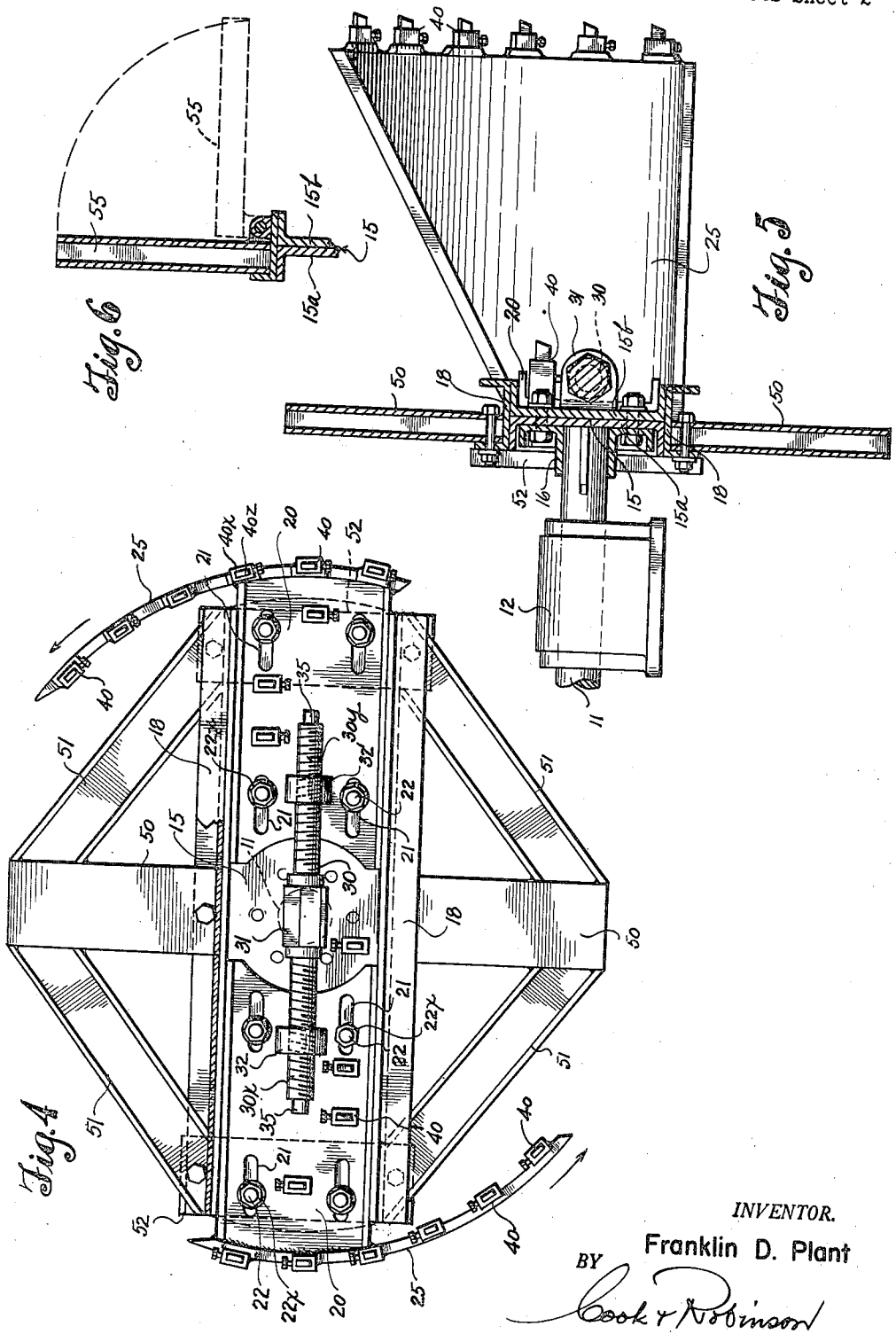
INVENTOR.
Franklin D. Plant
BY
Cook & Robinson
ATTORNEYS United States Patent Office 2,766,028
Patented Oct. 9, 1956

2,766,028
ROTARY BORING HEAD WITH MATERIAL ADVANCING MEANS

Franklin D. Plant, Renton, Wash.

Application October 12, 1953, Serial No. 385,397

5 Claims. (Cl. 262—7)

This invention relates to mining machines. More particularly, it has reference to power operated machines of the character of that shown and described in my co-pending application filed on November 13, 1951, under Serial No. 255,976, now abandoned; the present invention being specifically directed to an improved form of rotary boring head for use on that particular machine, or with similar machines, for mining operations or for use in connection with other operations where a tunnel or bore is formed by a rotary boring head that leaves a core of material that must be broken up for removal from the bore.

It is the principal object of this invention to provide a rotary boring head that is an improvement upon the boring head of cylindrical form described in my above mentioned pending application, particularly in providing for its extraction from the bore over the trackways, conveyors or the remaining loosened core material; in its facility for advancing the material that is cut loose and broken down away from the cutters of the head; in its provision for adjustment to increase or decrease within certain limits, the diameter of the tunnel or hole that is bored thereby, and in various other details of construction that reduce weight and produce a more desirable boring head for the present and other uses.

Still further objects of the invention reside in the details of construction and combination of parts embodied in the boring tool and in their mode of operation and use, as will be hereinafter described.

In accomplishing the above mentioned and other objects of the present invention, I have provided the improved details of construction the preferred forms of which are illustrated in the accompanying drawings wherein:

Fig. 1 is a side view of the present rotary boring head as applied in use to a power driven mining machine; the machine being shown in outline only.

Fig. 2 is a perspective view of the present rotary boring head as seen from the front; a part of one of the cutter blades being broken away for purpose of better illustration.

Fig. 3 is a top view of the boring head as seen from the top side when in the horizontal position in which it is shown in Fig. 4.

Fig. 4 is a front end elevation of the boring head.

Fig. 5 is a cross-section, taken in the central, vertical plane of the head.

Fig. 6 is a sectional detail showing a modified form of construction.

The present boring head is designed to be fixedly mounted on the forward end, and coaxially of a rotatably driven supporting shaft. It comprises a diametrically disposed fabricated cross-beam, at the opposite ends of which paired, arcuately curved blades are adjustably fixed to provide for change in diameter of the bores that may be made thereby. The blades are cylindrically curved about the extended axial line of the shaft, but comprise only short segments of a cylinder as distinguished from the full cylindrical form of boring head shown in the drawings of my pending application. These blades are adjustable toward and from each other, thus to provide for the formation of bores or holes of various diameters. In a machine in which the boring head of this invention is presently being used, the drive shaft is mounted on and extends forwardly of a crawler type tractor, and has a driving connection with the tractor's power plant. As the boring head is rotated, the tractor is advanced, thus to cause the head to cut a cylindrical hole. The core material that is thus cut free in the formation of the bore, either expands and distintegrates under its own internal pressure or is broken down and worked from the shaft.

Referring now to Fig. 1, 10 designates in its entirety, a supporting and driving tractor of crawler type. This may be like that disclosed in my co-pending application, or one similar thereto or any other suitable form of support. Extended forwardly from the tractor 10 is a shaft 11 rotatably supported near its forward end in a bearing 12 that is fixed on the tractor frame. Fixed rigidly to the forward end of the shaft 11 and perpendicular to its axis, is a fabricated cross-beam 15, best shown in Fig. 5, to comprise two channel beams, 15a and 15b, of the same dimensions, that are fixed back to back. Fixed centrally to this beam on the back side is a flanged collar 16, within which the forward end of shaft 11 is fitted and keyed.

Extended lengthwise of and along the top and bottom flanges of the cross-beam 15, as shown in Fig. 4, are outwardly facing channel beams 18—18; these being welded or otherwise secured thereto to give additional rigidity and strength.

Fitted between the opposite edge flanges of the beam 15 at its forward side, are channel members 20—20; these being slidably adjustable toward and from the axial center of the head. Each of the members 20 is formed with longitudinal slots 21 through which bolts 22, that are fixed in beam 15, extend. Nuts 22x are applied to these bolts and can be tightened against the channel members to retain them at any position of adjustment.

Fixed to the outer ends of the two adjustably mounted channel members 20—20 are the cutting blades 25—25. Each of these blades comprises a cylindrically curved plate of sheet metal, extended forwardly from the cross-beam 15; the blades being cylindrically curved about the extended axial center line of the shaft 11, as will be best understood by references to Fig. 4.

It is the intent that, in operation, the boring head will normally revolve in a counterclockwise direction, as seen from its front side. Therefore, its leading edge is beveled and sharpened and is angularly sloped away from the direction of rotation from outer toward the inner end of the blade, as seen in Fig. 5, so that, in its operation, this inclined edge will effect a rearward feeding of material that is cut free thereby. The trailing edge is parallel to the axial line of the head and is perpendicular to the plane of the cross-beam 15. Preferably it is sharpened for cuting if and when the head is reversed in its direction of rotation.

To effect equal and simultaneous adjustment of the blades in making a change in the effective diameter of the boring head, I associate an adjusting screw 30 therewith as has been shown in Fig. 4. This screw is rotatably mounted and fixed against endwise movement in a bearing block 31 that is welded to the front face of the beam 15 centrally between its ends. The screw 30 has the opposite end portions thereof threaded, with right hand and left hand threads, respectively as at 30x and 30y, and these portions are threaded through nuts 32 and 32' fixed, respectively, to the blade mounting slide plates 20—20. Wrench heads 35 are provided on the opposite ends of the screw 30 for its turning by a wrench or other suitable tool.

To effect the boring operation, cutters 40 are mounted on the forward edges of the blades and also at selected locations on the forward faces of the channels 20—20. These cutters preferably are like those, or similar to those shown in my previously mentioned co-pending application and are so applied to the rotating parts, that no two of them will follow the same path. This is accomplished by offsetting or staggering the cutters as applied to the forward edges of the blades and to the beam as has been shown in Fig. 4. Each cutter comprises a base block 40x that is welded to the supporting member, and in which a cutter bit 40z is removably mounted for easy repair or replacement.

It will be understood that as this boring head is rotated and advanced into a body of coal or the like, after the fashion illustrated in Fig. 1, the cutters 40 will operate to cut a core in the same manner as the core is cut by the device of the pending application. This core must necessarily be broken down and the reduced material removed. The pieces preferably are broken down to a predetermined maximum size by breaker screens fixed on the cross-beam to extend in opposite directions therefrom as seen in Fig. 4. Each of these screens as therein shown comprises a central post 50 that is rigidly fixed to the cross beam, 15, midway of its ends, to extend radially perpendicular from the axis about which it turns. Lateral members 51—51 extend from the outer ends of the beam 15 to the outer end of post 50. These parts are rigidly joined together, and tie bars 52—52 are applied across the inner face of the outer ends of beam 15 and are bolted thereto and to the ends of the lateral members 51.

In the operation of the mining machine, as thus equipped with the boring head, the coal, or other material being mined, and which will be broken free by the action of the advancing head, will be further reduced by contact with the cross beam 15 and the screen forming members to small size and will ultimately be passed rearwardly through the openings in and about the screen.

In Fig. 6, I have shown an alternative form of screen mounting wherein it is provided that the screens 55 can hinge downwardly from their normal perpendicular position shown in full lines, to the dotted line position. Therefore, when the vehicle is backed out of the shaft, the boring head, upon being turned to a horizontal position as in Fig. 4, can pass easily over any pipelines, railroad tracks, conveyors or other things which remain on the floor of the shaft or are carried along the ceiling.

The present form of boring head has various advantages over the cylindrical form shown in the copending application. First, it is adjustable in diameter; second, it provides for easier backing out of a shaft and a better breaking operation; third, it is relatively light in weight; fourth, it provides an automatic rearward feed of the reduced material; fifth, it permits the core to disintegratae under the force of internal pressure when relieved to atmospheric pressure.

All advantages of the cutter head of my prior application are retained and others are provided.

Such boring heads can be used in various types of mining operations, as well as for earth or rock boring. It can be made in various sizes, of various materials, and equipped either with the adjustable blade carriers or with blade carriers that are permanently fixed in place or bolted in place.

Having thus described my invention, what I claim as new therein and desire to secure by Letters Patent is:

1. In a mining machine of the character described, a boring tool comprising a rotatably driven shaft, a cross-beam fixed to the forward end of said shaft and extended equally to opposite sides thereof, a cutter plate mounted on each of the opposite ends of said beam and extended forwardly thereof a substantial distance, and each plate being cylindrically curved about the extended axial line of the driven shaft, and equipped along its forward end with cutting bits; said cutter plates having their leading edges sloped away from the direction of rotation from the outer to the inner end of the plates and said edges being beveled to effect a shearing cut and rearward feeding of loosened material.

2. A mining machine as recited in claim 1 wherein the cross-beam is equipped at spaced intervals therealong on its forward side, with cutting bits in a plane rearwardly of the bits carried by the forward ends of the plates for the breaking up of the core as freed by the forward bits.

3. A boring tool as recited in claim 2 wherein the said cross-beam has extension members mounted on its opposite end portions, and the said cutter plates are fixed, respectively, to said extension members; and said extension members are adjustably mounted on said beam for extension or retraction to change the effective diameter of the boring tool.

4. A boring tool as in claim 3 wherein the cross-beam comprises a forward facing portion of channel form, with extension members telescopically adjustable therewith at its opposite ends, with said cutter plates being fixed to the outer ends of said extension members, an adjusting shaft extending along the cross-beam, and rotatably fixed thereto at its axial center, and having its opposite end portions equipped respectively with right and left hand threads and nuts fixed to the extension members and receiving said threaded ends of the shaft therethrough, whereby adjusting and securing connections are made with the said extension members.

5. A boring tool as in claim 1 wherein breaker screens are hingedly fixed to opposite longitudinal edges of the cross-beam, and extend outwardly substantially to the diametrical limits of the bore as formed by the tool; said screens being equipped with means preventing them swinging rearwardly from the plane of rotation of the cross-beam and permitting them to swing forwardly upon retraction of the tool from a bore made thereby.

References Cited in the file of this patent

UNITED STATES PATENTS

| Number | Name | Date |
|---|---|---|
| 118,196 | Clark | Aug. 22, 1871 |
| 327,803 | Lewis | Oct. 6, 1885 |
| 504,179 | Stanley | Aug. 29, 1893 |
| 1,306,807 | Felton | June 17, 1919 |
| 1,335,723 | Campbell | Apr. 6, 1920 |
| 2,575,975 | Robbins | Nov. 20, 1951 |

FOREIGN PATENTS

| 672,403 | Great Britain | May 21, 1952 |

OTHER REFERENCES

Mining Congress Journal, May 1951, page 23. (Copy in Div. 47.)

Coal Age, May 13, 1926, page 669. (Copy in Div. 47.)

Mining Congress Journal, October 1938, page 70. (Copy in Div. 47.)